United States Patent [19]

Wilson

[11] 4,216,022

[45] Aug. 5, 1980

[54] WELL CEMENTING IN PERMAFROST

[75] Inventor: William N. Wilson, Plano, Tex.

[73] Assignee: Atlantic Richfield Company, Los Angeles, Calif.

[21] Appl. No.: 40,349

[22] Filed: May 18, 1979

[51] Int. Cl.² .............................................. C04B 7/32
[52] U.S. Cl. .................................................... 106/104
[58] Field of Search ................................ 106/104, 90

[56] References Cited

U.S. PATENT DOCUMENTS

| | | | |
|---|---|---|---|
| 2,945,539 | 7/1960 | Eilers | 106/104 |
| 3,922,172 | 11/1975 | Crinkelmeyer et al. | 106/104 |
| 4,047,567 | 9/1977 | Childs et al. | 106/90 |
| 4,082,561 | 4/1978 | Nakagawa et al. | 106/104 |

*Primary Examiner*—James Poer

*Attorney, Agent, or Firm*—Roderick W. MacDonald

[57] ABSTRACT

A composition for use in cementing a string of pipe or other apparatus in the permafrost region of a borehole of a well which composition is a dry cementitious mix which can be mixed with water on site for pumping into the wellbore and consists essentially of from about 40 to about 60 weight percent aluminate cement, from about 20 to about 30 weight percent alkaline earth metal sulfate, from about 10 to about 30 weight percent of at least one halide salt of an alkali metal and/or alkaline earth metal, from about 3 to about 8 weight percent attapulgite, from about 0.1 to about 1 weight percent of a mixture of at least one water soluble hydroxy carboxylic acid and a sulfoalkylated lignin, and from about 0.1 to about 1 weight percent of an alkali metal citrate.

5 Claims, No Drawings

WELL CEMENTING IN PERMAFROST

BACKGROUND OF THE INVENTION

Heretofore in drilling wells through permafrost regions the drilling fluid used to drill the well and cementing composition used to complete the well have proved expensive because permafrost drilling regions are often isolated in nature and the costs of transporting drilling fluid and cementing materials are quite high.

SUMMARY OF THE INVENTION

According to this invention a dry cementitious mix is provided which can be transported in, for example, sack form to the drilling site and then mixed with water and/or other liquids on site to provide the necessary cementing fluid for pumping into the wellbore.

The cementitious mix of this invention is tailored for use in the permafrost region of a wellbore. The mix will, when mixed with water, set up and harden when held at about 40° F. or below, will not freeze when being mixed with water on the surface of the earth before pumping into the wellbore, will stay suspended in water or other suspending liquid until the cement sets up, will set up within twenty-four hours and then gain strength for a time period thereafter, will support the wellbore casing to help prevent buckling should there be freeze back of the permafrost adjacent to the wellbore, and has been shown to be stable under repeated freeze-thaw cycles.

According to this invention the cementitious mix consists essentially of from about 40 to about 60 weight percent aluminate cement, from about 20 to about 30 weight percent alkaline earth metal sulfate, from about 10 to about 30 weight percent of at least one halide salt of an alkali metal and/or alkaline earth metal, from about 3 to about 8 weight percent attapulgite, from about 0.1 to about 1 weight percent of a mixture of at least one water soluble hydroxy carboxylic acid and a sulfoalkylated lignin, and from about 0.1 to about 1 weight percent of an alkali metal citrate.

Accordingly, it is an object of this invention to provide a new and improved composition for cementing wellbores in permafrost regions.

Other aspects, objects and advantages of this invention will be apparent to those skilled in the art from this disclosure and the appended claims.

DETAILED DESCRIPTION OF THE INVENTION

More specifically this invention relates to a cementitious mix for use in cementing in a permafrost region of a wellbore consisting essentially of from about 40 to about 60 weight percent aluminate cement, from about 20 to about 30 weight percent of at least one alkaline earth metal sulfate, from about 10 to about 30 weight percent of at least one halide salt of an alkali metal and/or alkaline earth metal, from about 3 to about 8 weight percent attapulgite, from about 0.1 to about 1 weight percent of a mixture of at least one water soluble hydroxy carboxylic acid and a sulfoalkylated lignin, and from about 0.1 to about 1 weight percent of at least one alkali metal citrate, all weight percents being based upon the total weight of the mix.

Preferably the cement is a calcium aluminate cement, more preferably Fondu cement, the sulfate is calcium sulfate, the halide salt is sodium chloride, and the citrate is at least one selected from the group consisting of sodium citrate, potassium citrate, and lithium citrate.

The sulfoalkylated lignin is a low molecular weight material having an average molecular weight or molecular size in the range of about 2,000–10,000 and preferably about 3,000–5,000. It is also thought to have a narrow molecular weight distribution. Prior art lignosulfonate compounds have a molecular weight or molecular size of about 10,000 and higher and the sulfonate substituent or radical attached directly on the carbon atom of the lignin molecule which is in the alpha position of the phenyl propyl side chain. This phenyl propyl or aliphatic chain is attached at a position on the benzene ring which is para to the phenolic hydroxyl group discussed herein. For lignosulfonate the phenolic hydroxyl group can be replaced by an alkoxy group as indicated by $R_1$—Ph—$OR_2$ wherein $R_1$ is the phenyl propyl side chain, Ph is phenyl or the benzene ring and $R_2$ is hydrogen or alky. The sulfoalkylated retarder composition of this invention has substantially all of the sulfoalkyl group (i.e., —R—$SO_3H$) in the position ortho to the phenolic hydroxyl group of the benzene ring of the lignin molecule.

The carboxylic acids are substantially alphatic carboxylic acids and preferably polyhydroxy carboxylic acids having at least one terminal carboxy group which can be in the form of the acid, a salt or mixtures thereof as described above for the sulfonate groups.

Particularly preferred polyhydroxy carboxylic acids have a molecular weight in the range of about 125–250. These carboxylic acids include gluconic acid, tartaric acid and equivalents thereof. Thus, the preferred group of hydroxy carobxylic acids are substantially linear aliphatic acids having about 4–10 carbon atoms, and preferably 4–8 carbon atoms. The molecular size and number of hydroxy and carboxylic groups will affect the water solubility. The hydroxy carboxylic acid is preferably present with the sulfoalkylated lignin in a ratio of acid to lignin preferably in the range of about 1:0.1–5.0 and preferably in the range of about 1:0.2–3.0.

Further details concerning carboxylic acid-lignin mixture can be found in U.S. Pat. No. 4,047,567, the disclosure of which is incorporated herein by reference.

The dry, solid, particulate mixture of the composition of this invention will disperse readily when mixed under normal mixing conditions, i.e., ambient conditions of temperature and pressure using normal on site mixing equipment, and the slurry develops adequate viscosity and gel strength with only moderate shear.

The dry mix of this invention can be mixed with water, salt or fresh, preferably using an excess of water such as at least 10 weight percent more water based on the weight of the mix of this invention.

After mixing, the liquid cementitious material is then pumped into the wellbore in normal manner as is well known in the art, and allowed to harden in place in the wellbore.

EXAMPLE

One hundred and thirty-three pounds of Fondu cement was dry mixed with sixty-seven pounds of calcium sulfate, fifty pounds of sodium chloride, ten pounds attapulgite, one pound of a mixture of water soluble hydroxy carboxylic acid and sulfoalkylated lignin in an acid to lignin weight ratio in the range of 1:0.1–5.0, and 0.5 pounds sodium citrate. This dry mix was cooled to about 15° F. and then mixed with three hundred fifty pounds fresh water at about 35° F. and atmospheric pressure for about 2 minutes under moderate shear. A portion of the resulting liquid cementing material was set up by holding it at 40° F. for twenty-four hours.

Compression tests and freeze-thaw tests of the hardened material indicated that the material would help support wellbore casings to aid in preventing buckling of the casing should thawing and freeze back of the permafrost occur, and further indicated that the cement would not tend to rubblize because of alternate freezing and thawing over the normal life of a producing well.

Reasonable variations and modifications are possible within the scope of this disclosure without departing from the spirit and scope of this invention.

The embodiments of the invention in which an exclusive property or privilege is claimed are defined as follows:

1. A cementitious mix for use in cementing in a permafrost region of a wellbore consisting essentially of from about 40 to about 60 weight percent aluminate cement, from about 20 to about 30 weight percent of at least one alkaline earth metal sulfate, from about 10 to about 30 weight percent of at least one halide salt of an alkali metal and/or alkaline earth metal, from about 3 to about 8 weight percent attapulgite, from about 0.1 to about 1 weight percent of a mixture of at least one water soluble hydroxy carboxylic acid and a sulfoalkylated lignin, and from about 0.1 to about 1 weight percent of at least one alkali metal citrate, all weight percents being based upon the total weight of the mix.

2. A cementitious mix according to claim 1 wherein said cement is essentially a calcium aluminate cement.

3. A cementitious mix according to claim 2 wherein said cement is essentially Fondu cement.

4. A cementitious mix according to claim 1 wherein said cement is essentially Fondu cement, said sulfate is calcium sulfate, said halide salt is sodium chloride, said salt of lignosulfonic acid is calcium sodium lignosulfonate, and said citrate is at least one selected from the group consisting of sodium citrate, potassium citrate, and lithium citrate.

5. A cementitious mix according to claim 1 wherein the weight ratio of said acid to lignin is in the range of about 1:0.1–5.0, wherein the carboxylic acid is a substantially linear aliphatic acid having at least one terminal carboxyl group in the form of acid, salt or mixtures thereof, wherein said sulfoalkylated lignin has a molecular weight in the range of about 2,000–10,000 and which is substantially sulfoalkylated on the benzene ring in the lignin molecule in the position ortho to the free phenolic hydroxy group and the sulfonate group is attached to the ortho position by an alkylidene radical having one to three carbon atoms.

* * * * *